United States Patent [19]

Attwell

[11] Patent Number: 4,630,415
[45] Date of Patent: Dec. 23, 1986

[54] FIRE STOP

[75] Inventor: Ronald L. Attwell, Wicklow, Ireland

[73] Assignee: Selkirk Division of Household Manufacturing Limited, London, England

[21] Appl. No.: 564,877

[22] Filed: Dec. 23, 1983

[51] Int. Cl.[4] ............................................. E04B 5/48
[52] U.S. Cl. ................................. 52/221; 285/189; 248/56
[58] Field of Search ...................... 52/221, 199, 232; 285/192, 189, 162; 248/56

[56] References Cited

U.S. PATENT DOCUMENTS

| | | | |
|---|---|---|---|
| 3,677,578 | 7/1972 | Roos | 285/162 |
| 3,695,648 | 10/1972 | Marosy | 285/162 X |
| 4,261,598 | 4/1981 | Cornwall | 52/221 |
| 4,363,199 | 12/1982 | Kucheria et al. | 52/221 |
| 4,364,210 | 12/1982 | Fleming et al. | 52/221 |
| 4,400,920 | 8/1983 | Logsdon | 52/221 |
| 4,411,458 | 10/1983 | Strunk et al. | 285/196 |
| 4,478,437 | 10/1984 | Skinner | 285/189 |
| 4,488,388 | 12/1984 | Schmidt | 52/221 |

FOREIGN PATENT DOCUMENTS 120312 9/1981 Japan ...................................... 52/221

Primary Examiner—Carl D. Friedman
Assistant Examiner—Naoko N. Slack
Attorney, Agent, or Firm—Owen, Wickersham & Erickson

[57] ABSTRACT

A fire stop for sealing the space between a flue pipe and the periphery of an opening in a floor through which the flue pipe passes comprises a collar having a bore for sealable engagement with the flue pipe. Portion of the outer periphery of the collar tapers in an axial direction for sealing engagement with a correspondingly tapered periphery of the opening. The collar is formed from two collar segments which are pre-fabricated from a fiber reinforced cementitious material which is selected so that the density of the material of the collar is similar to the density of the floor. Each segment extends into the space above the floor. A heating dissipating fin extends radially from the outer periphery of the collar above the opening. In the event of a fire in the flue the collar rises on its taper maintaining sealing engagement with the periphery of the opening and dissipating heat into the heat sink formed by the floor and into the ambient air above the floor.

15 Claims, 24 Drawing Figures

FIG. 7
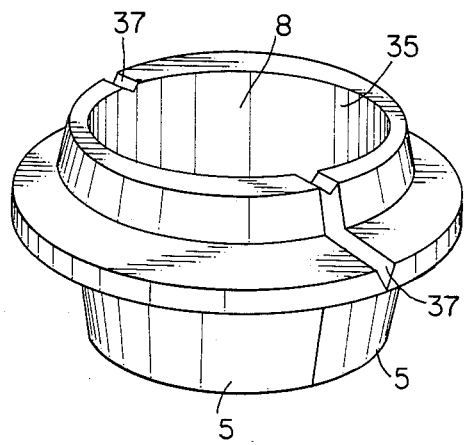
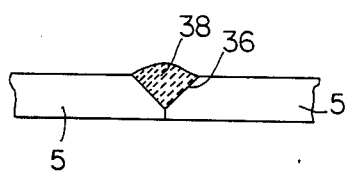
FIG. 8

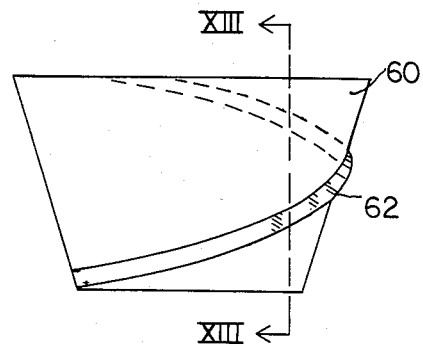
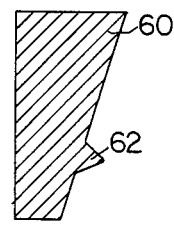
FIG. 12          FIG. 13
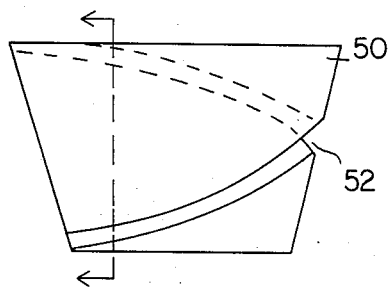
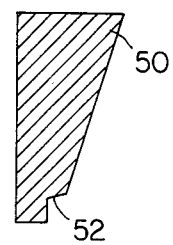
FIG. 10          FIG. 11
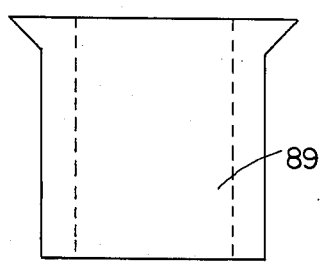
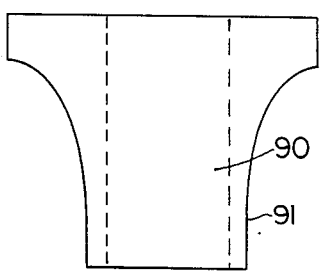
FIG. 23          FIG. 24

FIRE STOP

BACKGROUND OF THE INVENTION

1. Field of the Invention

The invention relates to a fire stop for sealing the space between a conduit, in particular a flue, and the periphery of an opening in a structural member through which the conduit passes.

2. Description of the prior art

When installing pre-fabricated chimney flues or ducts of stainless steel, galvanised steel or pre-cast concrete it is essential to seal the opening through which the chimney flue passes in order to restrict the passage of flame, smoke and gases in the event of a fire.

One of the methods used where the chimney flue is to be installed in a building constructed of concrete or a building with concrete slab floors is to first install the chimney flue in the desired position and cast the floor around the flue.

One disadvantage of this method is that considerable accuracy of installation is required as there is no scope for changing the position of the flue after the floor has been cast around it. In additiion, there is a risk that the chimney flue will be damaged during subsequent work operations. Further, the main construction activity is disrupted while the chimney flue is installed. Another disadvantage is that it is difficult to remove sections of the installed chimney or flue unit for repair or replacement. A further disadvantage which is especially apparent with conduits or flues of steel material is that because the duct or flue is fixed into position on heating the expansion of the flue results in buckling and subsequent rupture of the flue with a consequent escape of flame and gases.

OBJECTS OF THE INVENTION

One object of the invention is to provide a fire stop which will allow a chimney flue to be installed through either a concrete floor, ceiling, wall or any structural member after the completion of all structural building work.

A further object of the invention is to provide a fire stop typically to the following standard (BS 476: Part 8 1972 and DIN 4702): "The fire stop when used to seal a perforation caused by the passage or penetration of a chimney or duct through a floor or wall, shall be non-combustible and shall not collapse or show loss of integrity due to cracks or openings through which flame or hot gases could pass, nor shall the mean temperature of the unexposed surface of the fire stop or the chimney or duct increase by more than 140° C. above the initial temperature or the temperature of the unexposed surface increase at any point by 180° C. above the initial temperature, nor shall there by any emission of appreciable volumes of smoke or noxious vapours from the unexposed face of the component when a fire occur in either of the compartment, divided by the wall or floor through which the chimney or duct will pass. Fire resistance of a typical construction shall be verified by submitting a specimen constructed to the same specification to appropriate test methods".

SUMMARY OF THE INVENTION

According to the invention there is provided a fire stop for sealing the space between a conduit and the periphery of an opening in a structural member through which the conduit passes, the fire stop comprising a collar having a bore for sealable engagement with the conduit and an outer periphery, portion of the outer periphery of the collar tapering in an axial direction for sealing engagement with the periphery of the opening.

In one embodiment of the invention the collar is of a cementitious material.

In another embodiment of the invention the density of the material of the collar is substantially similar to the density of the material of construction of the structural member through which the conduit passes.

Preferably the tapered portion of the outer periphery of the collar corresponds with a complementary tapered portion of the periphery of the opening.

In another embodiment of the invention the collar is formed from at least two collar segments for embracing the conduit.

Preferably the collar is formed from two collar segments.

In a further embodiment of the invention the collar includes a heat dissipating fin extending radially from the outer periphery of the collar and located, in use, on one side of the opening through the structural member.

Preferably the heat dissipating fin extends around substantially all of the circumference of the collar.

Typically the fin includes a sealing face for bearing against the surface of the structural member on one side of the opening on insertion of the collar into the opening.

In another embodiment of the invention the collar is formed with a longitudinally extending cut-out groove for accommodating at least portion of a longitudinally extending seam on the conduit and/or a sealing compound.

Preferably the groove is provided at at least one longitudinal marginal edge of each segment, the grooves of adjacent segments together defining a chamber for accommodating portion of the seam and/or a sealing compound.

In a still further embodiment of the invention the segments are chamfered over at least portion of their exposed radially extending marginal edges to define a groove for accepting a sealing compound.

In another embodiment of the invention an axially extending spiral rib is provided on one of the outer periphery of the collar and the periphery of the opening, the other of the outer periphery of the collar and the periphery of the opening having a complementary shaped groove for receiving the rib.

In a still further embodiment of the invention the collar is formed with a cut-out portion to accommodate expansion of the collar on heating.

Preferably the cut-out portion comprises a groove extending circumferentially around the collar.

In a particularly preferred embodiment of the invention the collar is formed from two segments, each segment being substantially semi-circular in transverse cross-section for interengagement with a conduit and passageway of complementary circular cross-section.

Preferably the collar is pre-fabricated from a fibre-reinforced cementitious material.

Typically the collar projects through the opening on both sides of the structural member.

ADVANTAGES OF THE INVENTION

One advantage of the invention is that because portion of the collar tapers in an axial direction it facilitates sealable engagement with the passageway to prevent the escape of appreciable volumes of smoke or noxious vapours.

One advantage of the collar being of a cementitious material is that it is sufficiently fire resistant to meet the appropriate standards.

The advantage of the density of the material of construction of the structural member and the collar being similar is that heat transmission between the collar and the larger mass of the structural member which forms a heat sink is facilitated.

The advantage of the tapered portion of the outer periphery of the collar corresponding with a complementary tapered portion of the periphery of the opening is that it allows a particularly good seal to be achieved between the collar and the opening.

Another advantage is that it maintains sealing engagement between the collar and the opening while allowing relative movement between the collar and opening. This is of particular importance in the case where the conduit is of a steel material which expands a relatively large amount on heating. The complementary tapered portions allow the collar to rise as the steel expands while still maintaining the seal between the collar and the opening thus delaying buckling and subsequent rupture of the conduit.

The advantage of the collar being formed from at least two collar segments is that the collar can be placed into position after the conduit has been led through the opening and facilitates easy removal of the collar for maintenance purposes, for example when replacing a section of conduit.

The advantage of forming a collar from just two segments is ease of construction and handling.

The provision of a heat dissipating fin allows a proportion of the heat to be transferred through the collar to the other side of the passageway thus cooling down the collar and extending the time that effective heat transfer takes place.

The advantage of the fin including a sealing face is that it facilitates ease of installation of the collar and provides a bearing surface between the structural member and the opening as well as a large sealing area between the structural member and the collar preventing escape of smoke and gases.

The use of a longitudinally extending cut-out groove allows the collar to be easily fitted around the conduit having a longitudinally extending seam such as a metal flue pipe. In the case where the conduit does not have a seam or the seam does not fully fill the groove the advantage is that the groove may be filled with an intumescent or fire resistant sealing compound.

The advantage of chamfering the exposed radially extending marginal edges of the segments allows the collar to be fitted after the conduit is installed while allowing the collar segments to be bonded together for sealing between the segments.

The provision of an axially extending spiral rib and complementary groove facilitates axial movement of the collar to maintain a seal and increase the heat transfer area as the conduit expands on heating.

The advantage of providing a cut-out portion in the collar is to accommodate expansion of the collar on heating, deformations of the collar being taken up by the cut-out portions while still maintaining a sealing engagement with the passageway and conduit. In addition, the grooves may also give an improved surface friction allowing the collar to rise more easily particularly in large installations.

The advantage of fabricating the collar from a fibre-reinforced cementitious material is that such material is relatively light-weight and can be made sufficiently dense to have the required fire resistant properties.

These and other object and advantages of the invention will be readily apparent from the following description of some preferred embodiments thereof which are given by way of example only and are not intended to limit the scope of the invention.

BRIEF DESCRIPTION OF THE DRAWINGS

FIG. 7 is a perspective view of an alternative construction of fire stop, FIG. 8 is a side view on an enlarged scale of portion of the fire stop of FIG. 7 in use, FIG. 10 is a side view of another fire stop, FIG. 11 is a cross-sectional view on the line X1—X1 in FIG. 10, FIG. 12 is a side view of another construction of fire stop, FIG. 13 is a cross-sectional view on the line XIII—XIII in FIG. 12, FIGS. 14 to 22 are cross-sectional views of various alternative constructions of fire stop and, FIG. 23 to 24 are side views of further constructions of fire stop.

DETAILED DESCRIPTION OF THE INVENTION

Figure 1:
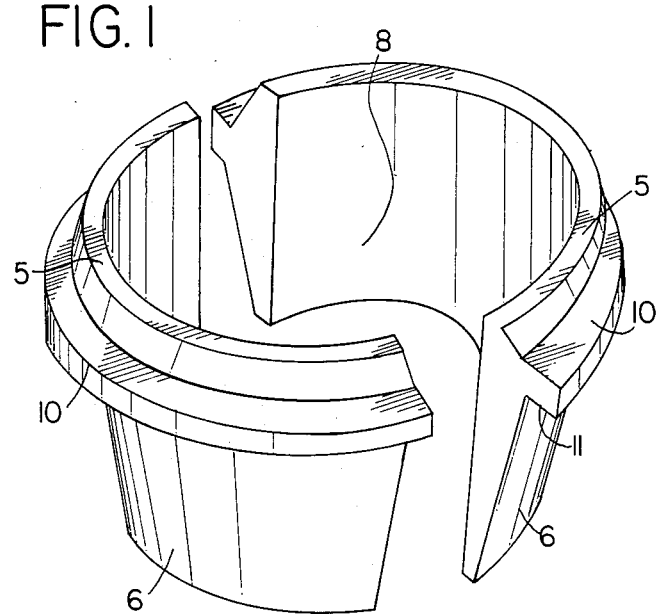
FIG. 1 is a perspective exploded view of a fire stop according to the invention formed from two segments.
Figure 2:
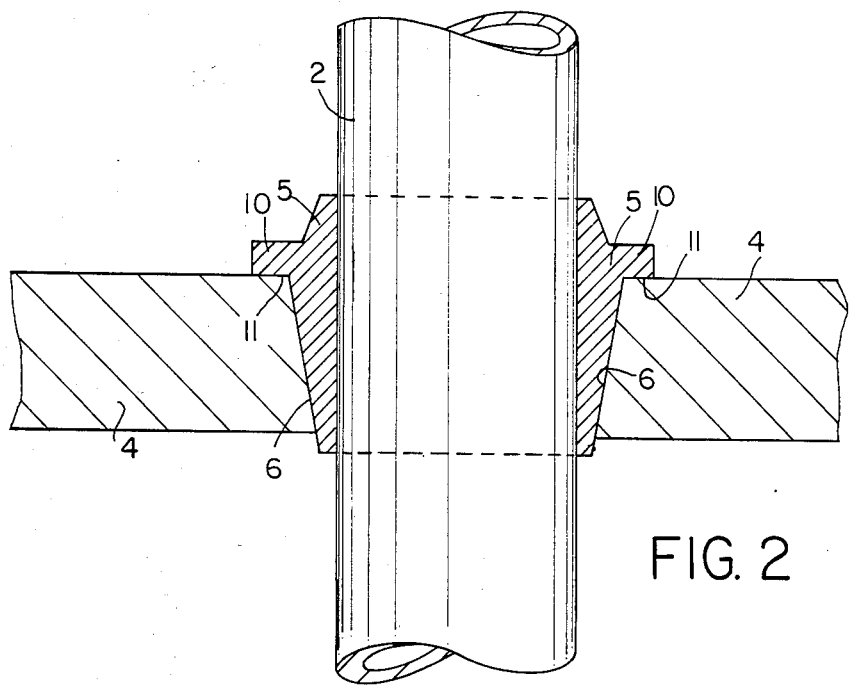
FIG. 2 is a cross-sectional view showing the fire stop of FIG. 1 in use.
Figure 3:
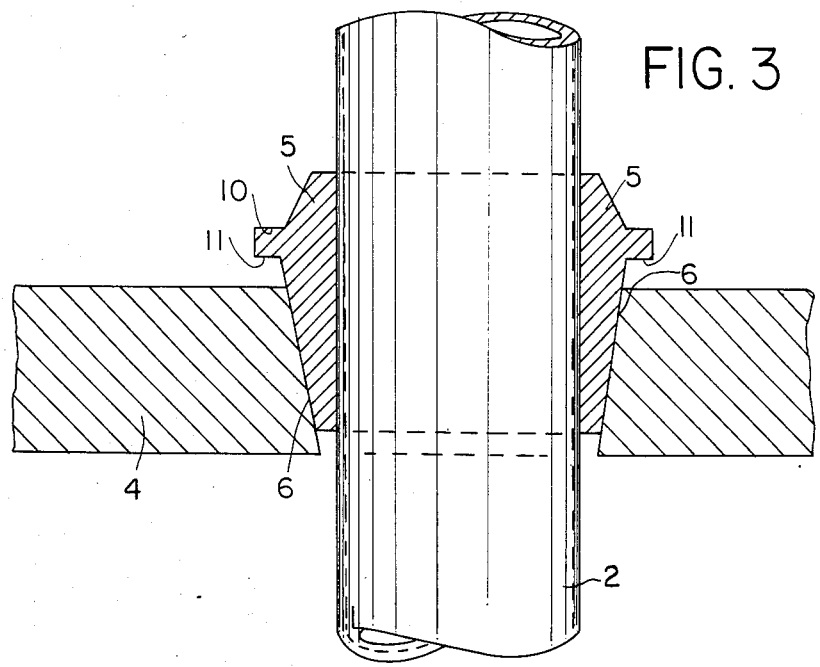
FIG. 3 is a cross-sectional view showing the position of the fire stop during a fire.

Referring to the drawings and initially to FIGS. 1 to 3 thereof there is illustrated a fire stop indicated generally by the reference numeral 1 for sealing the space between a conduit in this case a flue 2 and an opening 3 in a structural member, in this case a floor 4 through which the flue 2 passes. In this case the flue 2 and opening 3 are substantially circular in transverse cross-section and the fire stop 1 comprises a collar having a bore 8 for sealable engagement with the flue 2 and an outer periphery for sealing engagement with the opening 3. In this case the collar is formed from a pair of collar segments 5 each of which is substantially semi-circular in transverse cross-section.

Portion 6 of each collar segment 5 tapers in an axial direction for sealable engagement with the periphery opening 3. In this case the periphery of the opening 3 is formed with a complementary tapered portion 7 for sealable engagement with the outer periphery of each collar segment. The complementary tapered portion on each of the passageway and collar allows a single collar to be used for varying sizes of opening in a structural member, ensures sealable engagement between the collar and opening when heated and allows the collar to rise on its taper as the flue 2 rises on heating to provide a large area for heat transfer as will be described in more detail below.

Each collar segment 5 in this case is pre-fabricated from a cementitious material which is selected so that the density of the material of the collar is similar to the density of the material of construction of the floor 4 through which the flue 2 passes. In order to provide the necessary fire resistant properties the collar is usually of a cementitious material and is typically of a glass or steel fibre or other fibre reinforced cementitious material which is selected to give a dense material having the required fire resistant properties.

A heat dissipating fin in this case formed from a flange 10 extending around substantially all of the circumference of each collar segment 5 includes a sealing face 11 for bearing against the upper surface of the floor on one side of the opening 3.

Each collar segment 5 is sized so that the bore 8 of an assembled collar provides a tight fit to the external diameter of the chimney flue 2. Each segment is of sufficient depth to substantially fill the space between flue 2 and opening 3 and extend into the space above the floor 4. The depth above and below the floor surface level is determined according to the standard required to be met in relation to the size of chimney flue and local regulations.

During construction of a building an opening is cast or built into the structural member through which the chimney flue is to pass, the opening being of sufficient size to allow adequate clearance for the collar to be press fitted into position around the flue 2, when installed, and to accept the tapered portion of the collar in close contact. Usually the opening is cast into the floor by using a suitably sized and shaped bung (not shown) which typically is pre-fabricated from a mould which mirror images the tapered portion of the assembled collar. When the opening has been formed the bung is removed and at a suitable time, usually when the main construction work has been completed, the flue 2 is placed into position extending through the opening 3. On assembly, each collar segment 5 is placed around the flue 2 above floor level and pushed down into the passageway until the bearing surface 11 of the flange 10 is in sealing engagement with the upper surface of the floor 4. Each segment 5 is in sealing engagement with the opening and provides a positive lock on the flue 2 acting as a seal and heat sink for transmission and dispersion of heat away from the flue 2 into the floor 4 and finally into the ambient air above the floor.

It has been found that as the flue 2 heats up due to fire or excess heat below the floor 4 the flue 2 expands causing the collar to expand slightly and consequently to rise on its taper lifting the flange 10 clear of the surface of the floor 4 and providing even greater surface area for the dissipation of heat into ambient air above the floor. The position of the collar having risen up the flue a short distance is illustrated on an exaggerated scale in FIG. 3. It will be noted that primarily because the collar and floor are of materials which have similar densities the tapered portion of the collar and passageway are maintained in sealing contact. It appears that the force exerted by the flue is taken up by the collar which rises on the taper to relieve the pressure while still remaining in intimate contact with the periphery of the opening. Because of this intimate contact not only is sealing engagement maintained but there is no interruption in the heat flow from the collar to the floor which forms a heat sink for absorbing and dissipating the heat transferred from the flue through the collar.

Figure 5:
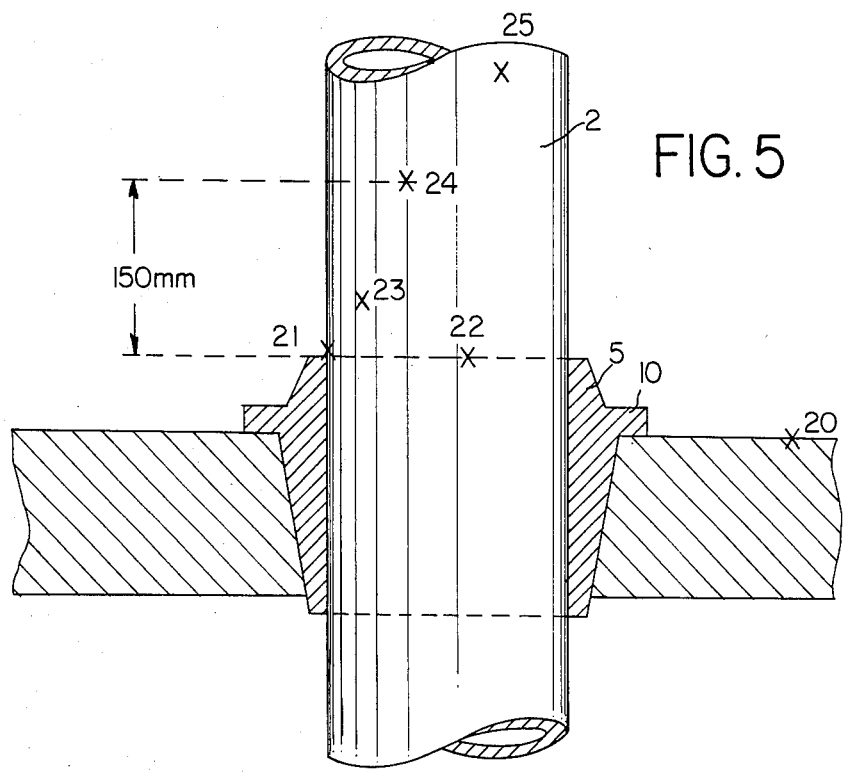
FIG. 5 is a side, partially sectional view showing the test locations.
Figure 4:
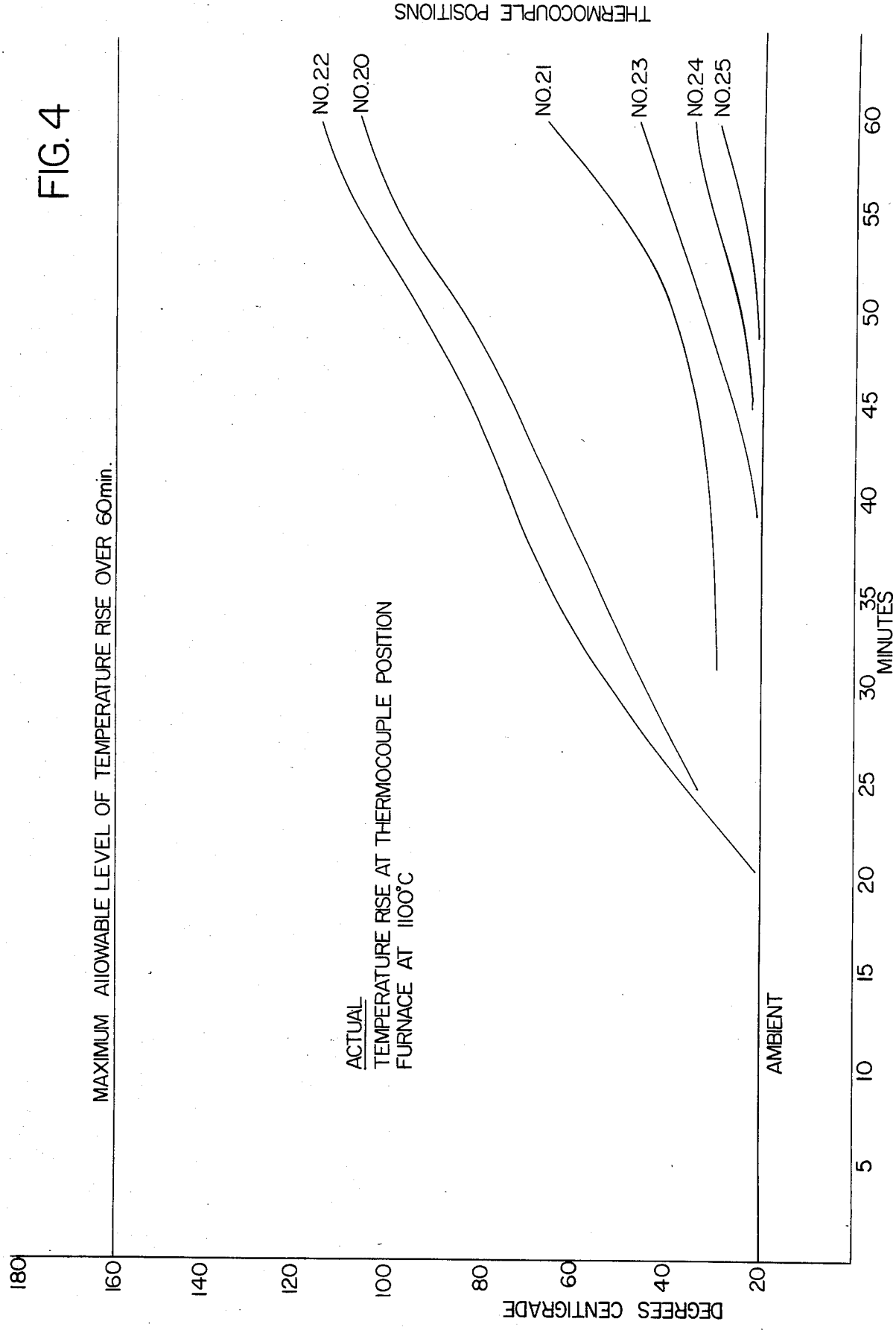
FIG. 4 is a graph showing the rise in temperature at various locations on and around the fire stop under test conditions.

Referring to FIGS. 4 and 5 in a test on the fire stop described above with reference to FIGS. 1 to 3 the rise in temperature around the collar, surrounding floor and on the flue above was established when the flue was placed in a test furnace at 900° to 1000° C. for 1 hour. Points indicated by reference numerals 20 to 25 in FIG. 5 show the position of thermo couples whose reaction over the test period is illustrated in FIG. 4. In the standard test positions 20, 21, 23 and 25 are fixed and positions 24 and 26 are randomly placed. It will be noted that the maximum rise in temperature at the critical points 22, 23 over 1 hour is less than 120° and over the standard 30 minutes is less than 60° C. The temperature monitored at all points after one hour was considerably less than the maximum allowable temperature of 160° C. showing that the collar more than adequately meets the requirements of BS 476 Part 8 1972 and DIN 4702 which have been referred to above. Visual inspection showed that almost no smoke or fumes escaped pass the collar.

The invention therefor represents a considerable advance in that it provides a fire stop which meets the required standards and allows a chimney flue or indeed any conduit to be assembled after the main construction work is complete. In addition it may be relatively easily removed for maintenance purposes.

Figure 6:
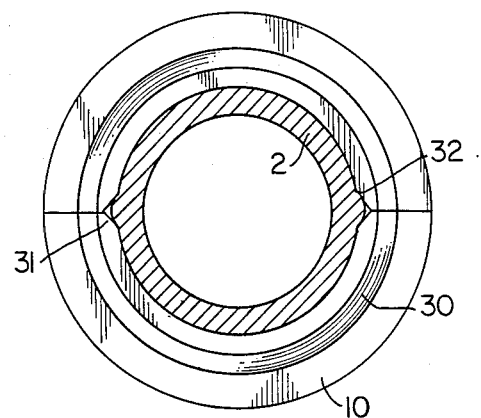
FIG. 6 is plan, partially sectional, view of an alternative construction of fire stop in use.

Referring to FIG. 6 a fire stop 30 similar to that illustrated in FIGS. 1 and 2 is illustrated and for clarity parts similar to those identified with to FIGS. 1 to 3 are assigned the same reference numerals. In this case each collar segment 5 is formed with a longitudinally extending cut-out groove for accommodating at least portion of a longitudinally extending seam 32 on the flue 2 and/or a sealing compound such as fire cement. In this case the groove is provided at at least one longitudinal marginal edge of each segment 5 and the grooves of adjacent segments together form a chamber 31 for accommodating portion of the seam and/or a sealing compound such as fire cement. The size of the chamber 31 may be larger than the flue seam 32 to allow for the retention of a small quantity of a sealing compound for example of intumescent material, if required. It will be appreciated that metal flue pipe generally have at least one such axially extending seam.

Referring to FIGS. 7 and 8 there is illustrated an alternative construction of fire stop indicated generally by the reference numeral 35. Parts similar to those of the fire stop described above with reference to FIGS. 1 to 3 are assigned the same reference numerals. In this case the radially extending marginal edges of each segment 5 are chamfered at 36 to form a groove 37 for accepting a sealing compound such as fire cement 38 or an intumescent material as will be apparent from FIG. 8. On assembly the groove 3 formed by the chamfered portions 36 of the segments 5 are filled with the fire cement 38 to join the two collar segments and seal any possible pathway for escape of combustion products between the meeting faces of the segments.

Figure 9:
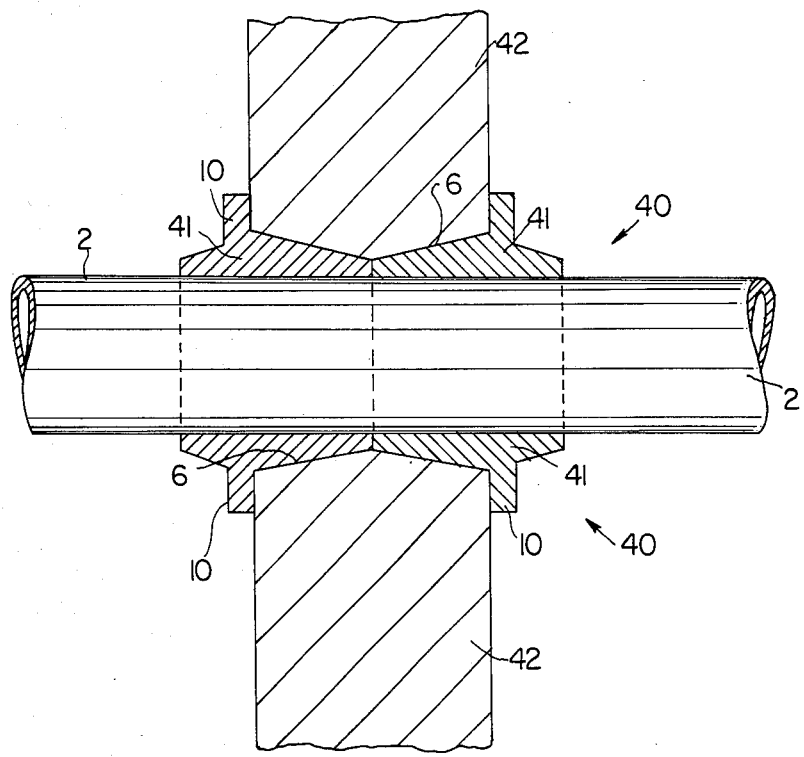
FIG. 9 is a cross-sectional view of an alternative construction of fire stop in use.

Referring to FIG. 9 an alternative construction of fire stop 40 for use with flues or ducts passing through walls or other vertical structural members is formed from four substantially semi-circular collar segments 41. Each segment 41 is similar to that described above with reference to FIGS. 1 to 3 and for clarity like parts are assigned the same reference numerals. In this case however each segment 41 is of sufficient depth to extend only partially, usually half-way through an opening in a vertical wall 42 and two collar segments 41 are inserted from either side of the wall 42 to fill the complementary shaped opening.

The tapered portions of each collar segment 41 extend towards the centre line of the wall for sealing engagement with the flue 2 which in this case extends horizontally through the opening.

Referring to FIGS. 10 and 11 there is illustrated an alternative construction of fire stop 50 formed from a single piece collar formed with a helical groove 52 for interengagement with a complementary rib (not shown) formed in the periphery of the opening in which the collar is mounted. The outer periphery of the collar 51 is tapered over its full length and has a large surface area at its uppermost end for dissipation of heat. It will be noted that because of the large surface area a heat exchange fin or flange may not be required. The groove 52 on the collar 51 and a complementary rib on a periphery of the opening allow the collar to more easily rise as the conduit expands, the collar turning around the axis of the flue as it rises.

Referring to FIGS. 12 and 13 a fire stop 60 is again formed from a collar 61 having a spiral rib 62 for interengagement with a complementary groove in the opening in which the fire stop is mounted. The rib 62 and groove interact in similar manner to the fire stop of FIGS. 10 and 11. It will be appreciated that any combination and configuration of groove and rib may be employed.

Figure 14:
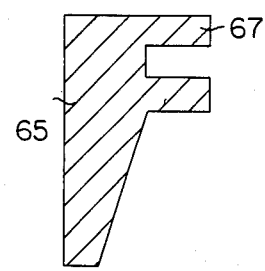
Figure 15:
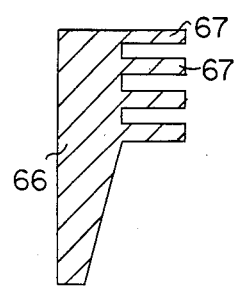
Figure 16:
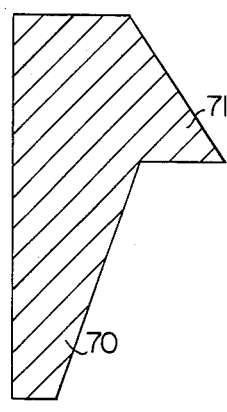

Referring to FIGS. 14 and 15 there are illustrated portions of alternative constructions of fire stops respectively 65 and 66 provided with additional heat exchange fins 67 for improved heat transfer efficiency from the collar to the ambient air on one side of a structural member. A further alternative construction of fire stop 70 is illustrated in FIG. 16. In this case a fin portion 71 is triangular in transverse cross-section. It will therefore be appreciated that any number, size, shape and configuration of heat exchange fins may be employed. In particular, it is not essential that the fins extend circumferentially around the collar indeed in some cases it may be preferable if each fin were cut radially into a plurality of smaller fins for even greater heat transfer efficiency.

Figure 17:
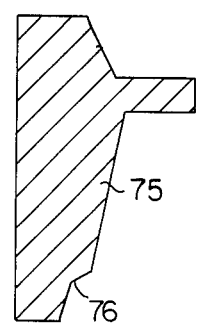

Referring to FIG. 17 there is illustrated an alternative construction of fire stop 75 similar to that described above with reference to FIGS. 1 to 3 but incorporating a helical groove 76 similar to that used in the fire stop described above with reference to FIGS. 10 and 11.

Figure 18:
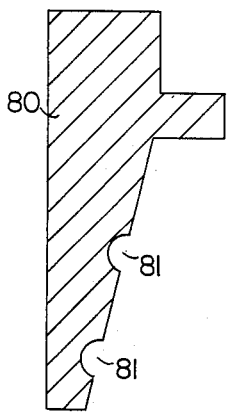

Referring to FIG. 18 a fire stop 80 again similar to that described above with reference to FIGS. 1 to 3 in this case is formed with two circumferentially extending cut-out grooves 81 on the outer surface of the tapered portion of the collar to facilitate deformation of the collar at elevated temperatures while still maintaining sealing engagement with the tapered portion of the periphery of the opening in which it is mounted. The grooves 81 may also give improved surface friction allowing the collar to rise more easily, particularly in large installations.

Figure 19:
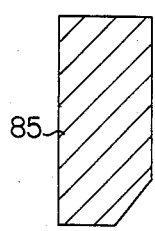
Figure 20:
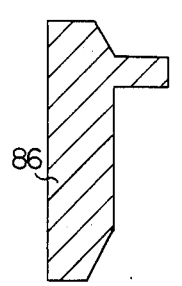
Figure 21:
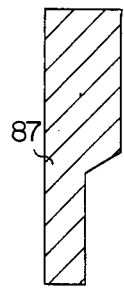
Figure 22:
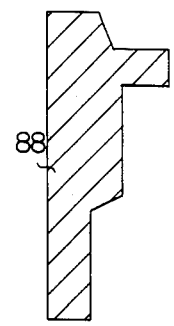

As easily mentioned each collar segment may be tapered over any desired poriton of its length or indeed over all its length. Various alternative constructions of fire stops with different tapered portions are illustrated in FIGS. 19 to 24 and indicated by the reference numerals 85 to 90 respectively. The tapered portion may extend from the lower edge of the fire stop as indicated in FIGS. 19, 20, and 24 or may commence any appropriate distance up from the bottom edge for example approximately mid-way as illustrated in FIGS. 21 and 22 or towards the top edge as illustrated in FIG. 23. In all cases the fire stops may be provided with or without heat exchange fins.

The tapered portion of each collar may appear as a straight line in transverse cross-section or any suitable shape such as the curve shape 91 of the fire stop 90 illustrated in FIG. 24.

Generally the periphery of the opening is formed with a complementary tapered portion for accommodating the tapered portion on the collars however it may be possible to obtain adequate and hence sealing engagement without the use of a tapered portion in the passageway. Where a tapered portion is used it may extend over substantially all of the periphery of the opening or over only a short distance or indeed over any depth of the opening.

The term "cementitious material" as used in this specification has the normal meaning applied to it in the art namely any material which has properties similar to that of conventional concrete. Thus, materials such as fire brick, stone, gypsum and conventional cementitious materials with or without fibre-reinforcement and including or excluding an aggregate are included. The material of the collar is selected to give the required fire resistance, sealing and heat dissipation. To assist in dissipation of heat to the heat sink formed by the structural member through which the flue passes.

The material of the collar is usually selected to have a density which corresponds to that of the structural member in which the collar will be mounted however in some cases it is envisaged that adequate sealing and heat dissipation may be achieved without this requirement. In some cases the material may have a higher density than that of the structural member for improved heat transfer Thus, the collar could be of a suitably fire resistant material.

The fire stop may be formed from a one piece collar which may be pushed over a free end of the conduit as it is being assembled. However for ease and installation and maintenance perferably the collars are formed from at least two or more collar segments. It is envisaged that in some cases the segments could be interconnected in a manner suitable to the material of construction used. The segments may be of any suitable shape and configuration to fit into a correspondingly shaped opening and sealably engage with a duct of any desired shape.

The conduit may be of any suitable material of construction for example metal or fire cement in the case of chimney flues. They may be of any cross-section for example square, rectangular or oval-shaped, the collar being shaped to fill the space between the conduit and the structural member through which it passes. The conduit need not necessarily be used for conveying flue gases but may for example be used for conveying cables and the like.

We claim:

1. A fire stop for sealing the space between a conduit and the periphery of an opening in a structural member through which the conduit passes, the fire stop comprising an annular collar of cementitioius material having a bore for sealable engagement with the conduit and an outer periphery, a major portion of the outer periphery of the collar being tapered in an axial direction to provide sealing engagement with the periphery of an opening.

2. A fire stop as recited in claim 1 wherein the density of the material of the collar is substantially similar to the density of the material of construction of the structural member through which the conduit passes.

3. A fire stop as recited in claim 1 wherein the collar is formed from at least two collar segments for embracing the conduit.

4. A fire stop as recited in claim 3 wherein the collar is formed from two collar segments.

5. A fire stop as recited in claim 3 wherein the segments are chamfered over at least portion of their exposed radially extending marginal edges to define a groove for accepting a sealing compound.

6. A fire stop as recited in claim 3 wherein the collar is formed from two segments, each segment being substantially semi-circular in transverse cross-section for interengagement with a conduit and a passageway of complementary circular cross-section.

7. A fire stop as recited in claim 1 wherein the collar includes a heat dissipating fin extending radially from the outer periphery of the collar and located, in use, on one side of the opening through the structural member.

8. A fire stop as recited in claim 7 wherein the heat dissipating fin extends around substantially all of the circumference of the collar.

9. A fire stop as recited in claim 7 wherein the fin includes a sealing face for bearing against the surface of the structural member on one side of the opening on insertion of the collar into the opening.

10. A fire stop as recited in claim 1 wherein the collar is formed with a longitudinally extending cut-out groove for accommodating at least a portion of a longitudinally extending seam on the conduit and/or a sealing compound.

11. A fire stop as recited in claim 10 wherein the groove is provided at at least one longitudinal marginal edge of each segment, the grooves of adjacent segments together defining a chamber for accommodating a portion of the seam and/or a sealing compound.

12. A fire stop as recited in claim 1 wherein a single axially extending spiral rib is provided on said major portion of the outer periphery of the collar, the periphery of the opening having a complementary shaped groove for receiving the rib.

13. A fire stop as recited in claim 1 wherein the collar is formed with a cut-out portion to accommodate expansion of the collar on heating.

14. A fire stop as recited in claim 13 wherein the cut-out portion comprises a groove extending circumferentially around the collar.

15. A fire stop as recited in claim 1 wherein the collar projects through the opening on both sides of the structural member.

* * * * *